(12) United States Patent
Huang

(10) Patent No.: US 8,290,123 B2
(45) Date of Patent: Oct. 16, 2012

(54) GATEWAY AND METHOD FOR DETECTING A COMMUNICATION LINK BETWEEN A CALLED TELEPHONE AND A TELEPHONE SWITCH

(75) Inventor: Jia-Xuan Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 594 days.

(21) Appl. No.: 12/612,043

(22) Filed: Nov. 4, 2009

(65) Prior Publication Data
US 2011/0064203 A1 Mar. 17, 2011

(30) Foreign Application Priority Data

Sep. 17, 2009 (CN) .......................... 2009 1 0307125

(51) Int. Cl.
*H04M 3/22* (2006.01)
*H04L 12/42* (2006.01)

(52) U.S. Cl. .................... 379/32.04; 370/258; 379/156; 379/188; 379/372; 379/395.01; 379/418; 455/426.1

(58) Field of Classification Search .................. 370/258; 379/32.04, 156, 180, 188, 372, 387.01, 395.01, 379/418; 455/426.1
See application file for complete search history.

(56) References Cited

U.S. PATENT DOCUMENTS

| 4,675,899 | A  | * | 6/1987  | Ahuja ............................ 379/180 |
| 5,694,460 | A  | * | 12/1997 | Wittman ........................ 379/156 |
| 6,181,777 | B1 | * | 1/2001  | Kiko ........................... 379/32.04 |
| 6,456,706 | B1 | * | 9/2002  | Blood et al. .................... 379/188 |
| 6,584,197 | B1 | * | 6/2003  | Boudreaux et al. ...... 379/413.02 |
| 6,714,644 | B1 | * | 3/2004  | Cohn et al. ..................... 379/372 |
| 6,914,980 | B2 | * | 7/2005  | Liu ........................... 379/395.01 |
| 6,917,681 | B2 | * | 7/2005  | Robinson et al. ........ 379/387.01 |
| 7,031,465 | B1 | * | 4/2006  | Dibble et al. ................. 379/418 |
| 7,792,282 | B1 | * | 9/2010  | Huang et al. .................. 379/418 |
| 2002/0197989 | A1 | * | 12/2002 | Cruder et al. ................. 455/426 |
| 2008/0095076 | A1 | * | 4/2008  | Kuo et al. ..................... 370/258 |
| 2011/0064203 | A1 | * | 3/2011  | Huang ....................... 379/32.04 |

* cited by examiner

*Primary Examiner* — Gerald Gauthier
(74) *Attorney, Agent, or Firm* — Altis Law Group, Inc.

(57) ABSTRACT

A method run in a gateway for detecting a communication link between a called telephone and a telephone switch is provided. The method firstly detects if a ringer equivalency number (REN) is equal to zero. If the REN equals to 0, the method further determines if each discharge curve of a positive wire and a negative wire of the called telephone complies with a corresponding standard discharge curve, so as to determine if the communication link between the called telephone and the telephone switch has been established.

16 Claims, 4 Drawing Sheets

GATEWAY AND METHOD FOR DETECTING A COMMUNICATION LINK BETWEEN A CALLED TELEPHONE AND A TELEPHONE SWITCH

BACKGROUND

1. Technical Field

Embodiments of the present disclosure relate to telephone link detecting technology, and particularly to a gateway and method for detecting a communication link between a called telephone and a telephone switch.

2. Description of Related Art

Currently, one method for detecting a communication link between a called telephone and a telephone switch includes detecting a capacitance between a positive wire and a negative wire of a telephone line that electrically connects the called telephone with the telephone switch, so as to obtain a ringer equivalency number (REN). If a value of the capacitance is greater than or equal to a preset value, the REN is regarded as one, otherwise, if the value of the capacitance is less than the preset value, the REN is regarded as zero. The method determines that the communication link between the called telephone and the telephone switch has been established if REN is not equal to one, or determines that the communication link between the called telephone and the telephone switch has not been established if REN is equal to zero.

However, sometimes, although the value of the capacitance is less than the preset value, actually, the communication link between the called telephone and the telephone switch has been established (i.e., REN≠0). Therefore, an error detect result will be generated if just determining whether REN is equal to zero or not, thus, a prompt and accurate detecting method is desired.

DETAILED DESCRIPTION

All of the processes described below may be embodied in, and fully automated via, functional code modules executed by one or more general purpose gateways or processors. The code modules may be stored in any type of readable medium or other storage device. Some or all of the methods may alternatively be embodied in specialized hardware. Depending on the embodiment, the readable medium may be a hard disk drive, a compact disc, a digital video disc, or a tape drive.

Figure 1:
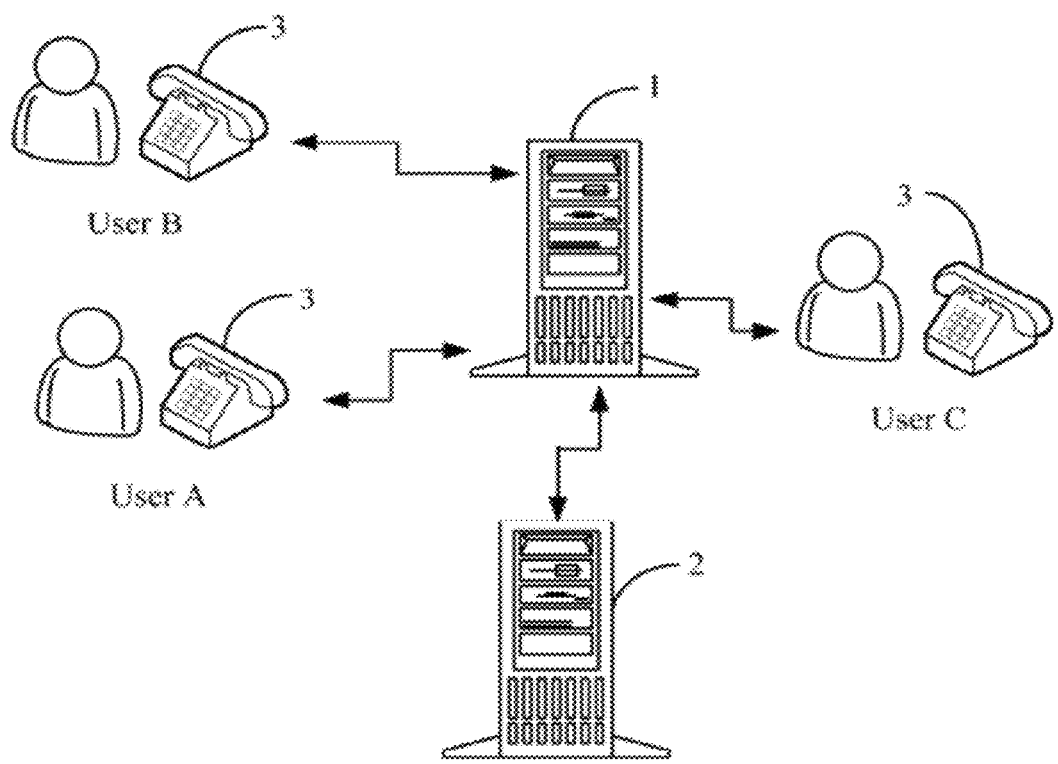
FIG. 1 is an applied environment diagram of one embodiment of a method for detecting a communication link between a called telephone and a telephone switch using a gateway.

FIG. 1 is an applied environment diagram of one embodiment of a method for detecting a communication link between a called telephone and a telephone switch 1 using a gateway 2. Referring to FIG. 1, the gateway 2 is connected to one or more telephones 3 through the telephone switch 1. In one embodiment, the telephone switch 1 is a private branch exchange (PBX).

Figure 2:
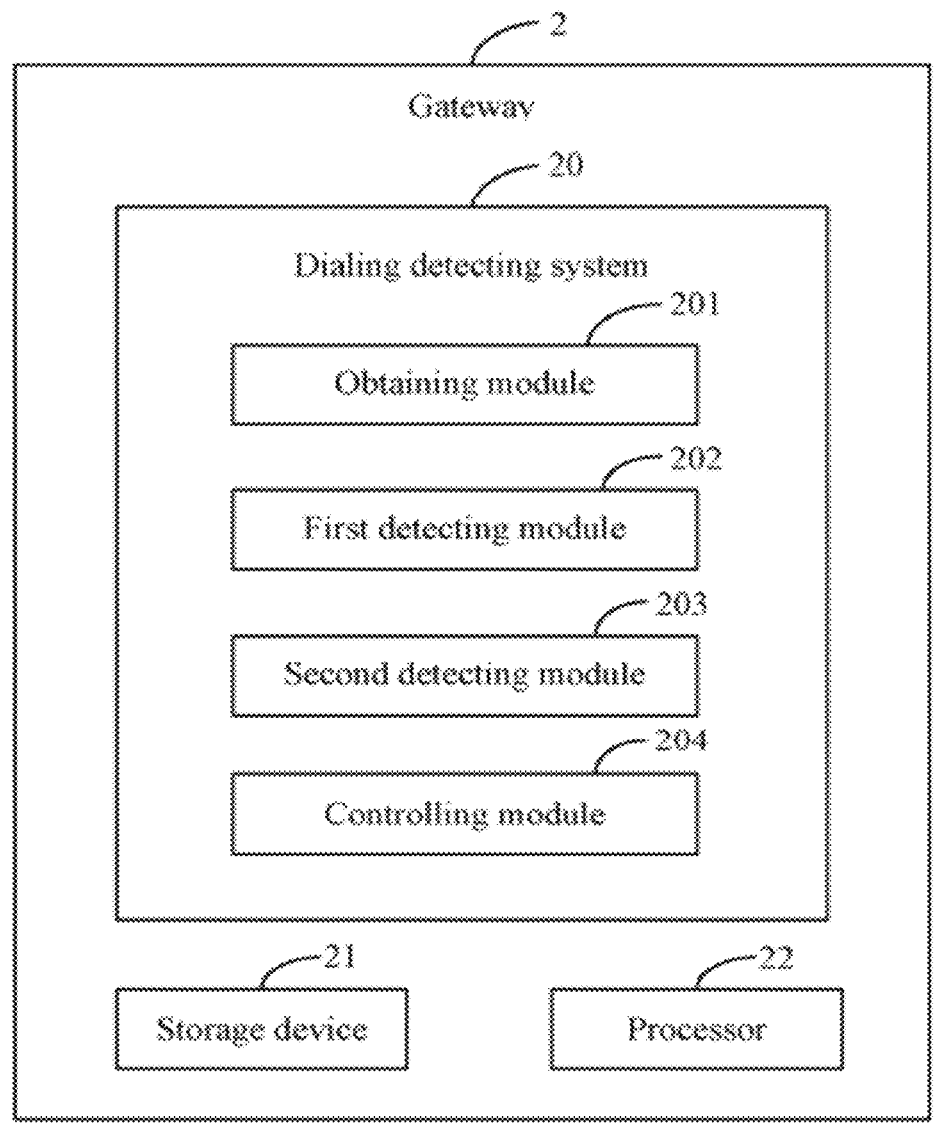
FIG. 2 is a block diagram of one embodiment of a gateway comprising a dialing detecting system.

Referring to FIG. 2, the gateway 2 includes a dialing detecting system 20. The dialing detecting system 20 firstly detects a communication link between a called telephone (e.g., a telephone 3 corresponding to a User B) and the telephone switch 1 by detecting if a ringer equivalency number (REN) is equal to zero. If the REN=0, the dialing detecting system 20 further determines if each discharge curve of a positive wire and a negative wire of the called telephone complies with a corresponding standard discharge curve, so as to determine if the communication link between the called telephone and the telephone switch 1 has been established. A detailed description will be given in the following paragraphs.

In one embodiment, the dialing detecting system 20 includes an obtaining module 201, a first detecting module 202, a second detecting module 203, and a controlling module 204. In one embodiment, the modules 201-204 comprise one or more computerized instructions that are stored in a storage device 21 of the gateway 2. A processor 22 of the gateway 2 executes the computerized instructions to implement one or more operations of the gateway 2.

The obtaining module 201 obtains dialing information of a called telephone. In one embodiment, the dialing information of the called telephone may include a telephone number and an address of the called telephone. In other embodiment, the obtaining module 201 further obtains dialing information of a calling telephone, wherein the dialing information of the calling telephone may include a telephone number and an address of the calling telephone.

The first detecting module 202 detects a capacitance between a positive wire (i.e., a tip wire) and a negative wire (i.e., a ring wire) of a telephone line that electrically connects the called telephone and the telephone switch 1, so as to obtain a ringer equivalency number (REN) of the called telephone. If a value of the capacitance is greater than or equal to a preset capacitance value (e.g., 8 microfarads), the REN is regarded as one, and the first detecting module 202 determines the communication link between the called telephone and the telephone switch 1 has been established. Otherwise, if the value of the capacitance is less than the preset capacitance value, the REN is regarded as zero. In one embodiment, if the communication link between the called telephone and the telephone switch 1 has been established, the first detecting module 202 determines that the called telephone has been answered by the calling telephone.

The first detecting module 202 further determines if the REN of the called telephone is equal to zero.

The second detecting module 203 obtains a discharge curve of the positive wire and a discharge curve of the negative wire if the REN of the called telephone is equal to zero. In one embodiment, the discharge curve of the positive wire or the negative wire may be used to show voltage change of the positive wire or the negative wire when the positive wire or the negative wire is discharged. A detailed description refer to FIG. 4.

The second detecting module 203 calculates a first deviation value between the discharge curve of the positive wire and a standard discharge curve of the positive wire, and calculates a second deviation value between the discharge curve of the negative wire and a standard discharge curve of the negative wire. An example of calculating the first deviation value is as follows. Firstly, the second detecting module 203 samples a specified quantity of voltage values in the discharge curve of the positive wire, and calculates a difference value between each sampled voltage value and a corresponding standard voltage value in the standard discharge curve of the positive wire. Then, the second detecting module 203 sums each calculated difference value, so as to obtain the first deviation value between the discharge curve of the positive wire and the standard discharge curve of the positive wire.

The second detecting module 203 determines if each of the two calculated deviation values (i.e., the first deviation value and the second deviation value) is less than a preset deviation value (e.g., one millimeter). If each of the two calculated deviation values is less than the preset deviation value, the second detecting module 203 determines that the called telephone and the telephone switch 1 has been connected. Otherwise, if any one calculated deviation value is greater than or equal to the preset deviation value, the second detecting module 203 determines that the called telephone and the telephone switch 1 has not been connected.

The controlling module 204 establishes a communication link between the called telephone and the telephone switch 1, if the REN of the called telephone is not equal to zero, or each of the two calculated deviation values is less than the preset deviation value. That is to say, the controlling module 204 starts to send communication signals to the called telephone through the telephone switch 1.

The controlling module 204 cancels the communication link between the called telephone and the telephone switch 1, if any one calculated deviation value is greater than or equal to the preset deviation value. That is to say, the controlling module 204 stops sending communication signals to the called telephone.

Figure 3:
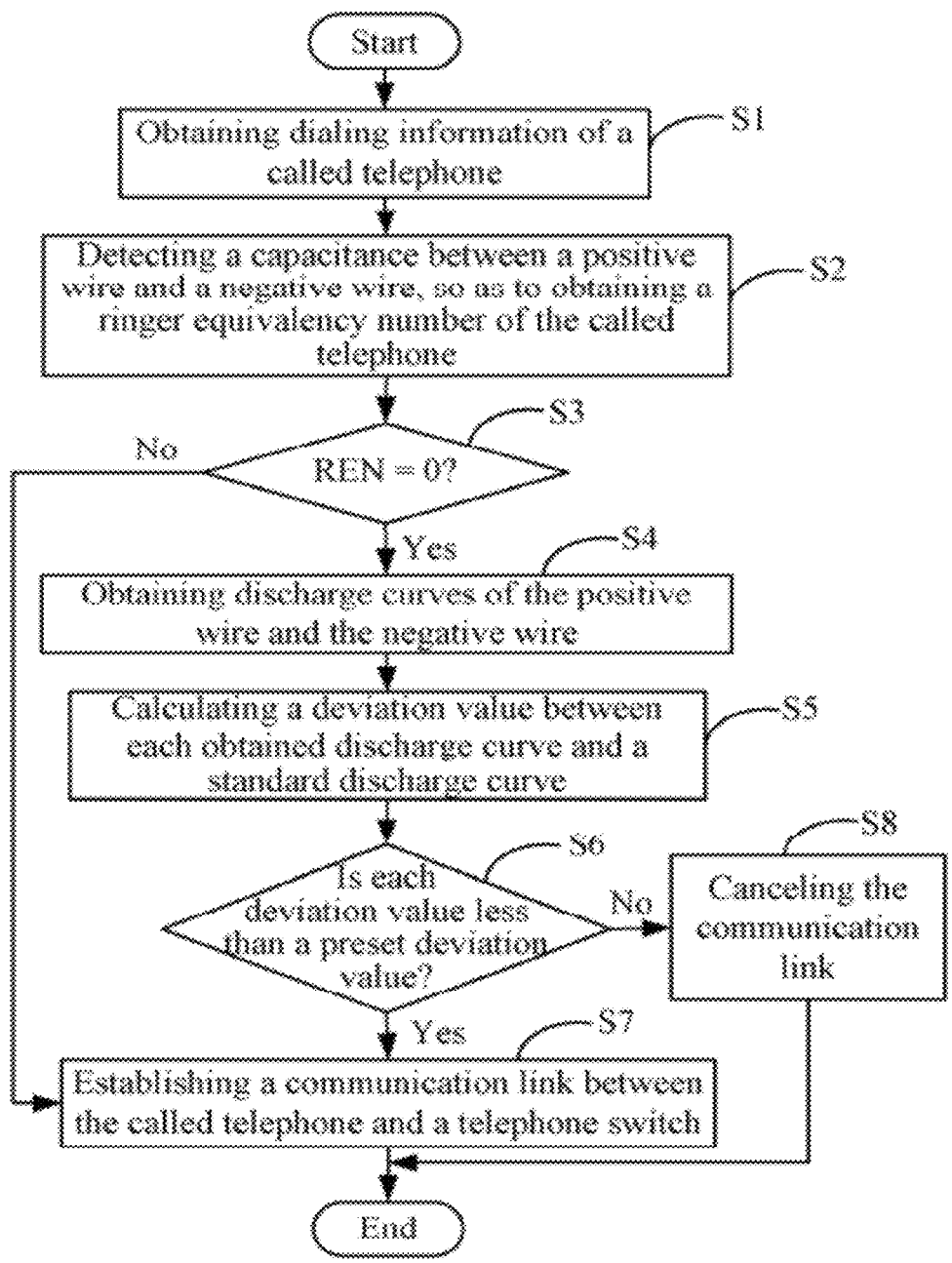
FIG. 3 is a flowchart of one embodiment of a method for detecting a communication link between a called telephone and a telephone switch.

FIG. 3 is a flowchart of one embodiment of a method for detecting a communication link between a called telephone and the telephone switch 1. Depending on the embodiment, additional blocks may be added, others removed, and the ordering of the blocks may be changed.

In block S1, the obtaining module 201 obtains dialing information of a called telephone. In one embodiment, the dialing information of the called telephone may include a telephone number and an address of the called telephone.

In block S2, the first detecting module 202 detects a capacitance between a positive wire (i.e., a tip wire) and a negative wire (i.e., a ring wire) of a telephone line that electrically connects the called telephone and the telephone switch 1, so as to obtain a ringer equivalency number (REN) of the called telephone. If a value of the capacitance is greater than or equal to a preset capacitance value (e.g., 8 microfarads), the REN is regarded as one, and the first detecting module 202 determines the communication link between the called telephone and the telephone switch 1 has been established. Otherwise, if the value of the capacitance is less than the preset capacitance value, the REN is regarded as zero.

In block S3, the first detecting module 202 determines if the REN of the called telephone is equal to zero. The procedure goes directly to block S7 if the REN of the called telephone is not equal to zero, or the procedure goes to block S4 if the REN of the called telephone is equal to zero.

In block S4, the second detecting module 203 obtains a discharge curve of the positive wire and a discharge curve of the negative wire. A detailed description refer to FIG. 4.

In block S5, the second detecting module 203 calculates a first deviation value between the discharge curve of the positive wire and a standard discharge curve of the positive wire, and calculates a second deviation value between the discharge curve of the negative wire and a standard discharge curve of the negative wire.

In block S6, the second detecting module 203 determines if each of the two calculated deviation values (i.e., the first deviation value and the second deviation value) is less than a preset deviation value. If each of the two calculated deviation values is less than the preset deviation value, the second detecting module 203 determines that the called telephone and the telephone switch 1 has been connected, the procedure goes to block S7. Otherwise, if any one calculated deviation value is greater than or equal to the preset deviation value, the second detecting module 203 determines that the called telephone and the telephone switch 1 has not been connected, the procedure goes to block S8.

In block S7, the controlling module 204 establishes a communication link between the called telephone and the telephone switch 1.

In block S8, the controlling module 204 cancels the communication link between the called telephone and the telephone switch 1.

Figure 4:
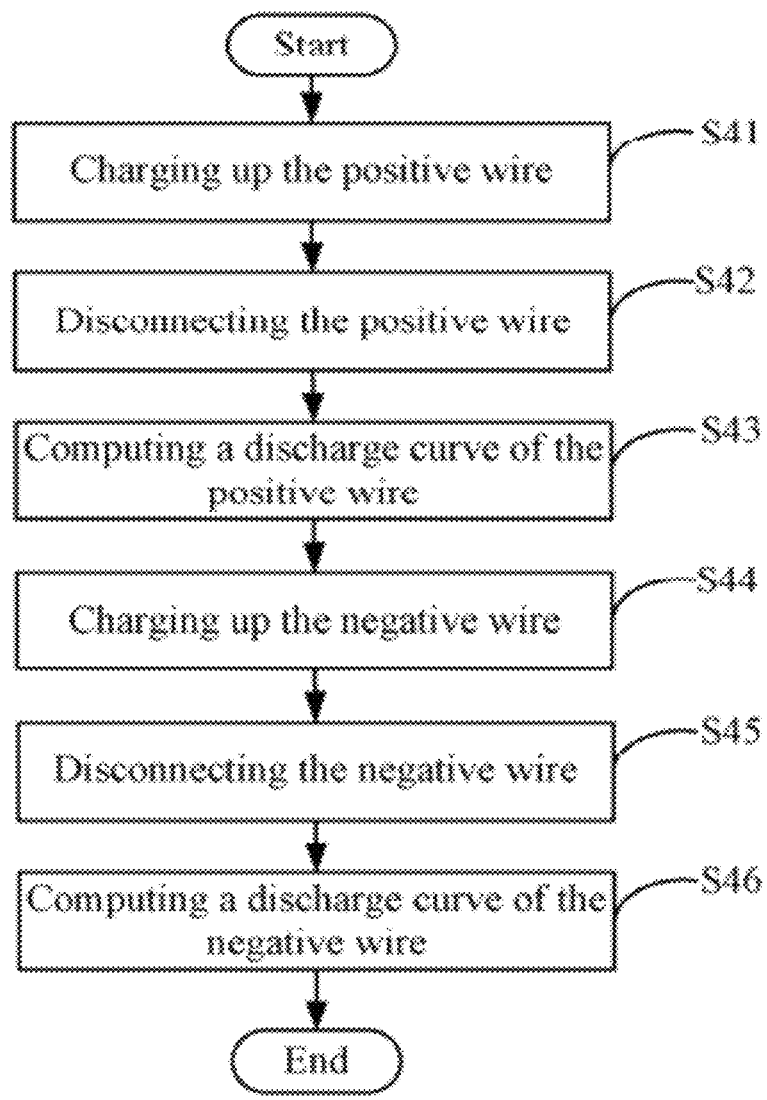
FIG. 4 is a detailed flowchart of one embodiment of block S4 in FIG. 3.

FIG. 4 is a detailed flowchart of one embodiment of block S4 in FIG. 3. Depending on the embodiment, additional blocks may be added, others removed, and the ordering of the blocks may be changed.

In block S41, the second detecting module 203 charges up the positive wire of the called telephone. That is to say, the second detecting module 203 supplies power to the positive wire of the called telephone.

In block S42, the second detecting module 203 disconnects the positive wire when a preset charge time (e.g., one second) of the positive wire reaches. That is to say, the second detecting module 203 ends supplying power to the positive wire of the called telephone.

In block S43, the second detecting module 203 computes the discharge curve of the positive wire.

In block S44, the second detecting module 203 charges up the negative wire of the called telephone.

In block S45, the second detecting module 203 disconnects the negative wire when a preset charge time (e.g., one second) of the negative wire reaches.

In block S46, the second detecting module 203 computes the discharge curve of the negative wire.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for detecting a communication link between a called telephone and a telephone switch by a gateway, the method comprising:
   (a) obtaining dialing information of the called telephone, wherein the called telephone is connected to the gateway through the telephone switch;
   (b) detecting a capacitance between a positive wire and a negative wire of a telephone line that electrically connects the called telephone and the telephone switch, so as to obtain a ringer equivalency number of the called telephone;
   (c) determining if the ringer equivalency number is equal to zero, and the procedure going directly to block (g) if the ringer equivalency number is not equal to zero, or the procedure going to block (d) if the ringer equivalency number is equal to zero;
   (d) obtaining a discharge curve of the positive wire and a discharge curve of the negative wire;
   (e) calculating a first deviation value between the discharge curve of the positive wire and a standard discharge curve of the positive wire, and a second deviation value between the discharge curve of the negative wire and a standard discharge curve of the negative wire;

(f) determining if each of the two calculated deviation values is less than a preset deviation value, and the procedure going to block (g) if each of the two calculated deviation values is less than the preset deviation value, or the procedure going to block (h) if any one calculated deviation value is greater than or equal to the preset deviation value;

(g) establishing a communication link between the called telephone and the telephone switch; and (h) canceling the communication link between the called telephone and the telephone switch.

2. The method according to claim 1, wherein the dialing information of the called telephone comprises a telephone number and an address of the called telephone.

3. The method according to claim 1, wherein obtaining a ringer equivalency number of the called telephone comprises:
determining the ringer equivalency number is equal to one, if a value of the capacitance between the positive wire and the negative wire is greater than or equal to a preset capacitance value; and
determining the ringer equivalency number is equal to zero, if the value of the capacitance between the positive wire and the negative wire is less than the preset capacitance value.

4. The method according to claim 1, wherein obtaining a discharge curve of the positive wire and a discharge curve of the negative wire comprises:
charging up the positive wire;
disconnecting the positive wire when a preset charge time of the positive wire reaches;
computing the discharge curve of the positive wire;
charging up the negative wire;
disconnecting the negative wire when a preset charge time of the negative wire reaches; and
computing the discharge curve of the negative wire.

5. The method according to claim 1, wherein telephone switch is a private branch exchange (PBX).

6. A storage medium having stored thereon instructions that, when executed by a processor of a gateway, cause the processor to perform a method for detecting a communication link between a called telephone and a telephone switch, the method comprising:

(a) obtaining dialing information of the called telephone, wherein the called telephone is connected to the gateway through the telephone switch;

(b) detecting a capacitance between a positive wire and a negative wire of a telephone line that electrically connects the called telephone and the telephone switch, so as to obtain a ringer equivalency number of the called telephone;

(c) determining if the ringer equivalency number is equal to zero, and the procedure going directly to block (g) if the ringer equivalency number is not equal to zero, or the procedure going to block (d) if the ringer equivalency number is equal to zero;

(d) obtaining a discharge curve of the positive wire and a discharge curve of the negative wire;

(e) calculating a first deviation value between the discharge curve of the positive wire and a standard discharge curve of the positive wire, and a second deviation value between the discharge curve of the negative wire and a standard discharge curve of the negative wire;

(f) determining if each of the two calculated deviation values is less than a preset deviation value, and the procedure going to block (g) if each of the two calculated deviation values is less than the preset deviation value, or the procedure going to block (h) if any one calculated deviation value is greater than or equal to the preset deviation value;

(g) establishing a communication link between the called telephone and the telephone switch; and (h) canceling the communication link between the called telephone and the telephone switch.

7. The storage medium according to claim 6, wherein the dialing information of the called telephone comprises a telephone number and an address of the called telephone.

8. The storage medium according to claim 6, wherein obtaining a ringer equivalency number of the called telephone comprises:
determining the ringer equivalency number is equal to one, if a value of the capacitance between the positive wire and the negative wire is greater than or equal to a preset capacitance value; and
determining the ringer equivalency number is equal to zero, if the value of the capacitance between the positive wire and the negative wire is less than the preset capacitance value.

9. The storage medium according to claim 6, wherein obtaining a discharge curve of the positive wire and a discharge curve of the negative wire comprises:
charging up the positive wire;
disconnecting the positive wire when a preset charge time of the positive wire reaches;
computing the discharge curve of the positive wire;
charging up the negative wire;
disconnecting the negative wire when a preset charge time of the negative wire reaches; and
computing the discharge curve of the negative wire.

10. The storage medium according to claim 6, wherein telephone switch is a private branch exchange (PBX).

11. The storage medium according to claim 6, wherein the medium is selected from the group consisting of a hard disk drive, a compact disc, a digital video disc, and a tape drive.

12. A gateway system for detecting a communication link between a called telephone and a telephone switch, comprising:
an obtaining module operable to obtain dialing information of the called telephone, wherein the called telephone is connected to the gateway through the telephone switch;
a first detecting module operable to detect a capacitance between a positive wire and a negative wire of a telephone line that electrically connects the called telephone and the telephone switch, so as to obtain a ringer equivalency number of the called telephone;
the first detecting module further operable to determine if the ringer equivalency number is equal to zero;
a second detecting module operable to obtain a discharge curve of the positive wire and a discharge curve of the negative wire, if the ringer equivalency number is equal to zero;
the second detecting module further operable to calculate a first deviation value between the discharge curve of the positive wire and a standard discharge curve of the positive wire, and a second deviation value between the discharge curve of the negative wire and a standard discharge curve of the negative wire;
the second detecting module further operable to determine if each of the two calculated deviation values is less than a preset deviation value;
a controlling module operable to establish a communication link between the called telephone and the telephone switch, if the ringer equivalency number is not equal to zero, or each of the two calculated deviation values is less than the preset deviation value; and the controlling module further operable to cancel the communication link between the called telephone and the telephone switch, if any one calculated deviation value is greater than or equal to the preset deviation value; and at least one processor to execute the obtaining module, the first detecting module, the second detecting module, and the controlling module.

13. The system according to claim 12, wherein the dialing information of the called telephone comprises a telephone number and an address of the called telephone.

14. The system according to claim 12, wherein the first detecting module obtains a ringer equivalency number of the called telephone by:

determining the ringer equivalency number is equal to one, if a value of the capacitance between the positive wire and the negative wire is greater than or equal to a preset capacitance value; and determining the ringer equivalency number is equal to zero, if the value of the capacitance between the positive wire and the negative wire is less than the preset capacitance value.

15. The system according to claim 12, wherein the second detecting module obtains a discharge curve of the positive wire and a discharge curve of the negative wire by:

charging up the positive wire;

disconnecting the positive wire when a preset charge time of the positive wire reaches;

computing the discharge curve of the positive wire;

charging up the negative wire;

disconnecting the negative wire when a preset charge time of the negative wire reaches; and computing the discharge curve of the negative wire.

16. The system according to claim 12, wherein telephone switch is a private branch exchange (PBX).

* * * * *